May 3, 1966 A. C. BORGMAN 3,249,179
SAFETY DEVICES FOR ELEVATORS OR THE LIKE
Filed June 3, 1965 2 Sheets-Sheet 1
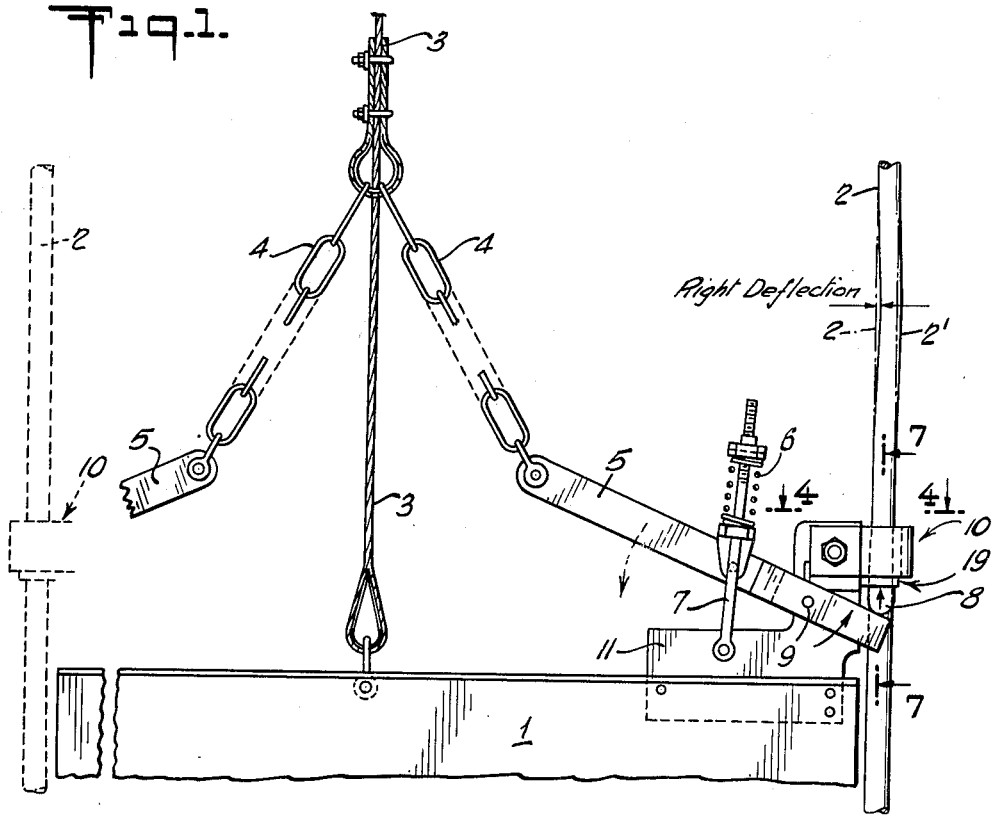
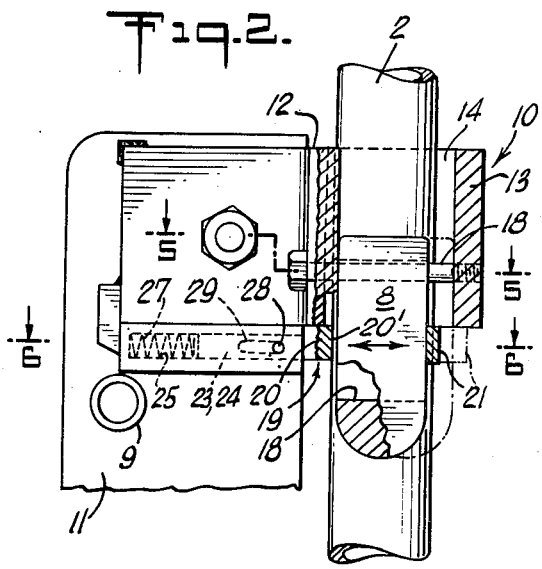
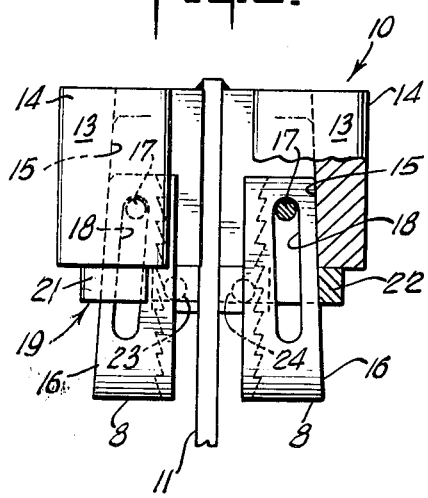
INVENTOR:
ARTHUR C. BORGMAN
BY
Curtis, Morris & Safford
ATTORNEYS.

May 3, 1966 A. C. BORGMAN 3,249,179
SAFETY DEVICES FOR ELEVATORS OR THE LIKE
Filed June 3, 1965 2 Sheets-Sheet 2
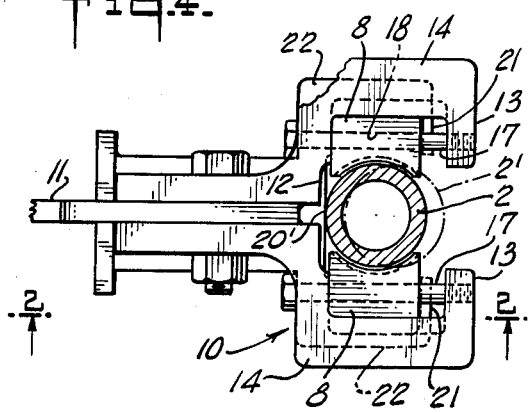
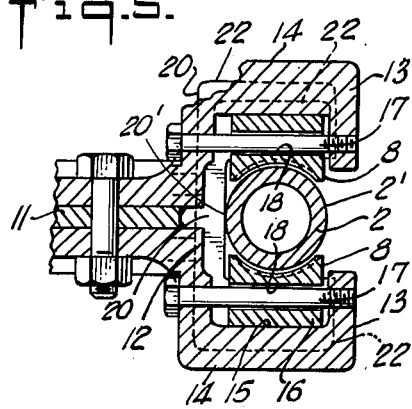
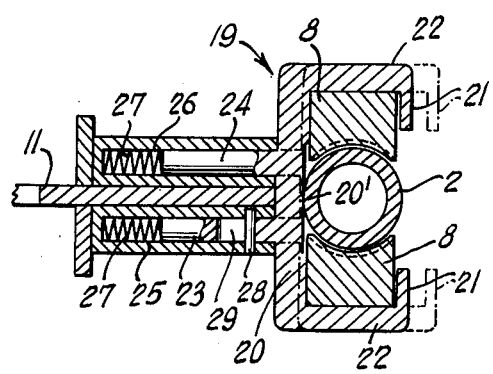
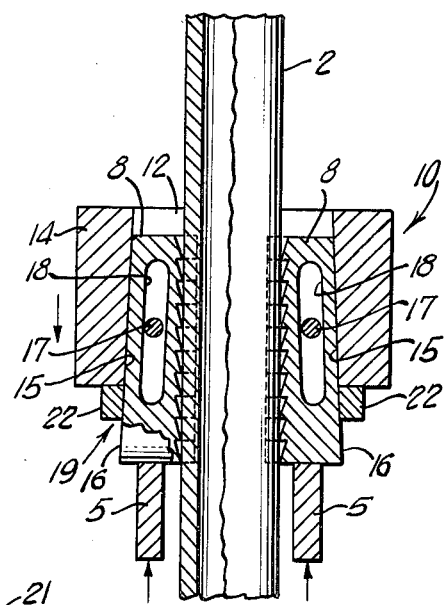
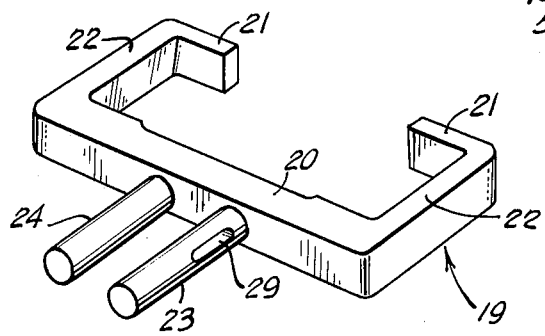
INVENTOR
ARTHUR C. BORGMAN
BY
Curtis, Morris & Safford
ATTORNEYS.

3,249,179
SAFETY DEVICES FOR ELEVATORS OR THE LIKE
Arthur C. Borgman, Franklin Square, N.Y., assignor to Harsco Corporation, Long Island City, N.Y., a corporation of Delaware
Filed June 3, 1965, Ser. No. 461,096
6 Claims. (Cl. 187—88)

The present invention relates to safety devices for elevators, or the like.

Various automatic braking expedients have been employed in cable operated elevators, hoists or the like whereby descent of the cage is effectively stopped when the supporting cable breaks. Devices used for this purpose have included cooperating jaws which are released or forced into gripping engagement with vertical elements as guide rails, posts, cables, rods or the like, commonly provided at opposite sides of the shaft or path of travel of the cage.

It has been found that effectiveness of the braking mechanism is impaired and other undesirable results, as damage to the apparatus, are experienced in cases where the cable breaks while a normally rigid and vertical guide rail or safety post or rod or a part thereof, is displaced out of substantially vertical condition, as where the safety post or a portion thereof at one side of the shaft is bowed outwardly from substantially vertical co-axial relation to the space between the cooperating clamping jaws. Such displacements can occur due to defects in the installation or may result from forces developed in operation of the cage.

Accordingly, an object of the invention has been to provide in an elevator installation a braking device or post gripping jaw assembly for use with a guide rail or safety post whereby the position of the cooperating gripping jaws is automatically controlled to maintain the space between them in substantially coaxial relation to the post in normal operation as well as when a portion of such post is displaced outwardly from its normal effective operative position.

A further object has been to provide a post gripping jaw assembly which can readily be incorporated in certain existing types of hoists or elevator installations at moderate expense, with relatively minor changes in design and without reducing the operating effectiveness of the structure as a whole. An important aspect of the improved device is that it may serve to avoid failure or malfunctioning of the safety brakes due to displacement of a guide or post, until the latter can be restored to effective operating condition.

In general, an embodiment of the invention suitable for use with installations which include cage guides or safety posts at opposite sides of the elevator shaft comprises a housing mounted on the elevator cage and wherein a pair of gripping jaws is supported in operative relation to each post, each such housing having a rear wall, front walls and side walls. Said jaws are mounted in the housing in a manner to effect wedging action on the post, and for that purpose, are slidable vertically and transversely on and between opposed inner faces of said walls toward and from operative post gripping position. They are also slidable horizontally in the housing between said rear wall and said front walls to maintain their effective cooperating relation with the post when a portion thereof is displaced out of vertical position. A jaw guide coacting with the post and engaging said jaws is slidable horizontally in the housing in opposite directions to move said jaws between said rear and front walls thereof while permitting them to slide up and down toward and from post gripping position, said jaws being thereby maintained in operative coaxial relation to the post in different positions of displacement thereof or of portions thereof, from normal substantially perpendicular operative position, and said guide being advantageously spring pressed outwardly into yielding sliding engagement with the post.

Other objects and distinctive features of the invention not above referred to or defined will appear from the following specification and claims and from the accompanying drawings wherein:

FIG. 1 is a parly fragmentary view in front elevation of a suspension assembly including parts carried at the top of an elevator cage which rides between and normally guides on vertical posts, and wherein post gripping jaws, normally disengaged therefrom, are mounted in a housing and positioned to grip said post when the suspending cable is broken;

FIG. 2, a detail view on enlarged scale, partly in vertical section showing a housing with the jaws in retracted or non-gripping condition;

FIG. 3, a detail end view on enlarged scale, partly in vertical section, of said housing with the pair of gripping jaws shown mounted therein in normal or inoperative non-gripping relation;

FIG. 4, a detail top plan view partly in horizontal section from line 4—4 of FIG. 1 of the parts illustrated in FIGS. 2 and 3, said gripping jaws being shown in open or non-gripping relation to the post in its operative position between and coaxial with their opposed gripping faces and disposed substantially in normal vertical condition;

FIG. 5, a detail view in horizontal section on the line 5—5 of FIG. 2, but with the position of the gripping jaws adjusted outwardly, i.e. to the right from their normal position as seen in FIG. 4 to conform to an outwardly deflected position or displacement of the post and so that the space between the gripping faces of said jaws remains substantially coaxial with the displaced post or portion thereof;

FIG. 6, a detail view in horizontal section on the line 6—6 of FIG. 2 and illustrating more particularly the guide or slide by which the jaws are moved to conform to a deflected position of the post, or parts thereof, while said jaws remain free to slide vertically in the housing and said guide toward and from post gripping position;

FIG. 7, a detail view in vertical section on the line 7—7 of FIG. 1 showing the jaws in gripping or braking engagement with the safety post; and FIG. 8, a view in perspective of the jaws engaging guide.

Referring to the drawings, an embodiment of my invention is advantageously employed in connection with elevator mechanism including a cage 1 mounted to ride in a path between vertical guides or safety posts 2 mounted in an elevator shaft or the like.

A hoisting cable 3 is rigged to support cage 1 through a linkage system including chains 4 and levers 5. In operation, lifting force applied to cable 3 rocks levers 5 thus compressing springs 6 on shackles 7 and permitting the braking jaws 8 to be positioned normally in retracted non-gripping relation to post 2, as seen in FIGS. 2 through 6. If cable 3 is broken, spring 6 expands and forces lever 5 to turn counterclockwise, FIG. 1, around pivot 9. A free end portion of said lever is thus thrust upwardly against rounded bottom end surface portions of said jaws 8 which are thereby moved upwardly and laterally from inoperative or retracted position, FIGS. 2 and 3, and wedged into operative post gripping position, as seen in FIG. 7.

To facilitate operation as above described, a housing 10 for jaws 8 is mounted on bracket 11 carried by cage 1. As seen in FIGS. 2 and 4, said housing includes a back wall 12, laterally spaced front walls 13, and opposed side walls 14 connecting said back and front walls. Interior surfaces of said back and front walls are arranged and dimensioned to be slidably engaged by vertically disposed end and side outer faces of jaws 8; and interior inclined surfaces 15, FIG. 3, of side walls 14 are slidably engaged by inclined surfaces 16 of jaws 8 which are conveniently retained in housing 10 by bolts 17 extending through inclined slots 18 to permit limited in and out adjusting movement of the jaws as indicated by arrows, FIG. 2.

Thus, said jaws, in sliding upwardly also move laterally along with said vertical movement into rod gripping position where they are wedged or cammed inwardly by said inclined surfaces 15, 16 toward each other to clamp on post 2, FIG. 7. The outward thrust incident to impact of the jaws on the post is thus transmitted to and absorbed by the housing.

According to the arrangement of parts above described, and with the posts 2 disposed substantially vertically in the elevator shaft, each pair of jaws 8 is positioned with a post 2 extending coaxially between them and spaced from their opposed gripping faces so that in normal operation of cage 1 said jaws move freely therewith up and down the shaft.

To provide against a cable break when one or the other of said posts, or portions thereof, may be or become bowed or displaced outwardly, as seen at 2', FIGS. 1 and 4, means are provided by which jaws 8 are maintained in effect, in floating relation to post 2 and housing 10 whereby they may adjust freely and automatically in the direction indicated by the arrow, FIG. 2, within the space between the rear wall 12 and front wall 13 of said housing. In this figure, the pair of jaws 8 is shown (full lines) in its extreme left position and (dotted) in its extreme right position in the housing.

Means for effecting automatic continuous control of the position of jaws 8 include a jaw guide or slide 19 biased outwardly, FIGS. 2, 6 and 8, and including a rear wall 20, spaced front walls 21 and side walls 22 connecting said front walls to end portions of the rear wall. A portion of the face, as at 20', of the rear wall 20 continuously engages and rides yieldingly against opposed surface portions of post 2 with up and down travel of cage 1. Each side and connected front wall of slide 19 provides, in effect, a hook which extends around one side and to that extent embraces one of the jaws 8 so that it may be moved inwardly as well as outwardly.

Slide 19 is advantageously supported in operative position by rods, as 23 and 24, projecting rearwardly from wall 20 and slidable endwise in sockets 25 and 26, respectively, provided in a portion of housing 10. The inner ends of said rods bear yieldingly against cushioning springs 27 in said sockets which bias the slide outwardly against post 2, the extent of in and out movement thereof being limited by a cross pin 28 extending through a slot 29 in rod 23. Thus, jaws 8 travel freely past said posts while the latter remain in normal vertical position as seen in the FIG. 4 position and in this normal condition of the parts, the space between the jaws of each pair of jaws 8 is and remains in effect, coaxial with the post 2 associated therewith.

However, if said post or a part thereof should be bowed out or displaced, as at 2', FIGS. 1 and 4, the slide 19 will continue to bear against the bowed out portion, thereby adjusting jaws 8 outwardly horizontally to a new or outer position, as seen, for example, in FIG. 5. Thus, the jaws and the post remain operatively coaxial so that, if the suspension cable breaks and the cage carries jaws 8 past the bowed out portion of the post, said jaws will still function effectively and thus move into braking or post gripping position even if in some installations one of the posts may be bowed or displaced as much as 1½" from its proper vertical position. This provides a safety factor heretofore not available in connection with cable actuated hoists or elevators.

It therefore appears from the foregoing description taken in connection with the drawings that, in operation, when the parts are in normal relation, i.e. with the posts vertical, the housing 10 on cage 1 will travel freely up and down with jaws 8 occupying the retracted or open position as seen, full lines in FIG. 4. If cable 3 breaks, jaws 8 will be thrust upwardly toward gripping position and wedged against post 2 as above described. In a case where post 2 is bowed outwardly, as at 2', FIG. 1, and normal operation of the cage brings the jaws into register with such a bowed out portion, the spring pressed slide or jaw guide which bears outwardly against post 2 follows the bowed out longitudinal contour thereof and thereby in effect, maintains the space between the jaws substantially in coaxial relation with the post. Thus, the jaws will operate effectively if the cable breaks regardless of the displaced condition of the post or a part thereof.

I claim:

1. In a safety device for elevators of the type wherein a cage is suspended on a cable between substantially vertical posts or guides adjacent to opposite sides of the cage; cooperating opposed gripping jaws positioned on said cage and arranged for movement to and from effective gripping engagement with said post; means provided to automatically move said jaws into post gripping position when the cable is broken; the combination of a housing for the jaws mounted on said cage and having spaced opposed walls which extend outwardly from the cage and provide opposed bearing surfaces between which said jaws are operatively mounted to slide freely toward and from each other and up and down coaxially with the post to and from post gripping position, and a jaw engaging guide mounted to be moved in opposite directions to impart horizontal movement to said jaws, said jaws being freely slidable up and down in relation to said housing and said guide whereby, when the guide moves the jaws horizontally to maintain coaxial relation thereof with a portion of the post which is deflected from its normal vertical position, said jaws are maintained in condition to effectively grip the post if the cable breaks.

2. In a safety device for hoisting apparatus employing a cage suspended by cable between guide posts or the like, the combination which includes a housing on the cage, a pair of cooperating post gripping jaws mounted to slide endwise therein and being normally positioned with their opposed gripping faces in spaced non-gripping relation to the post, spring actuated means cooperating with the cable and operatively engaging said jaws and arranged and adapted to move the latter upwardly in said housing into gripping relation with the post when the cable breaks, and jaw guiding means slidable horizontally in relation to said housing and operatively engaging said jaws and being movable to effect horizontal adjustment of said jaws in relation to the post while said jaws remain freely movable into post gripping relation at different positions of horizontal adjustment thereof in relation to said housing.

3. In a safety device for elevators or the like wherein a cage travels between normally vertical posts, the combination which includes a housing mounted on said cage, a pair of cooperating post gripping jaws mounted therein to slide vertically up and down and in and out in relation thereto, and a jaw guide having portions bearing yieldingly against a post and operatively engaging said jaws which are slidable up and down in relation to said guide coextensively with their up and down sliding movement in said housing, and spring means operatively interposed between said housing and the jaw guide whereby the latter is biased outward horizontally toward yielding contact with the post.

4. A safety device for elevators or the like, as defined in claim 3 and including means operatively related to said housing and said guide and arranged and adapted to limit the extent of horizontal in and out movement of the guide and the jaws.

5. A safety device for elevators or the like, as defined in claim 1 and wherein the means for guiding the jaws in their horizontal in and out movement in relation to the housing includes a guide frame having parts which slidably embrace intermediate portions of said jaws and are arranged in slidable engagement with portions of the housing.

6. A safety device for elevators or the like as defined in claim 3 and wherein said housing includes means arranged and adapted to support said jaws in the housing normally in retracted non-gripping relation and to limit the extent of endwise movement of said jaws.

References Cited by the Examiner
UNITED STATES PATENTS

| | | | |
|---|---|---|---|
| 2,804,175 | 8/1957 | Phillips | 181—86 |
| 3,220,510 | 11/1965 | Morris | 187—86 |

EVON C. BLUNK, *Primary Examiner.*

H. C. HORNSBY, *Assistant Examiner.*